Jan. 28, 1969 E. OLALAINTY 3,423,851

HANDWRITING TRAINING DEVICE

Filed Oct. 24, 1966

Inventor
Edouard Olalainty
By Cushman, Darby & Cushman
Attorneys

Jan. 28, 1969

E. OLALAINTY 3,423,851

HANDWRITING TRAINING DEVICE

Filed Oct. 24, 1966

Inventor
Edouard Olalainty
By Cushman, Darby & Cushman
Attorneys

United States Patent Office 3,423,851
Patented Jan. 28, 1969

3,423,851
HANDWRITING TRAINING DEVICE
Edouard Olalainty, Rue F. de St.-Jayme 64,
St.-Palais, France
Filed Oct. 24, 1966, Ser. No. 588,872
Claims priority, application France, Oct. 29, 1965,
36,618
U.S. Cl. 35—37                           3 Claims
Int. Cl. G09b 11/04

ABSTRACT OF THE DISCLOSURE

The invention relates to a device for teaching handwriting and for the rehabilitation of slightly disturbed motor activity of the upper limbs. This device essentially consists of a set of plates on which different graphic signs are imprinted under the form of hollow tracks and of a set of plastic styles with graded flexural rigidities adapted to be grasped by a test subject for tracing the tracks.

---

Figure 1:
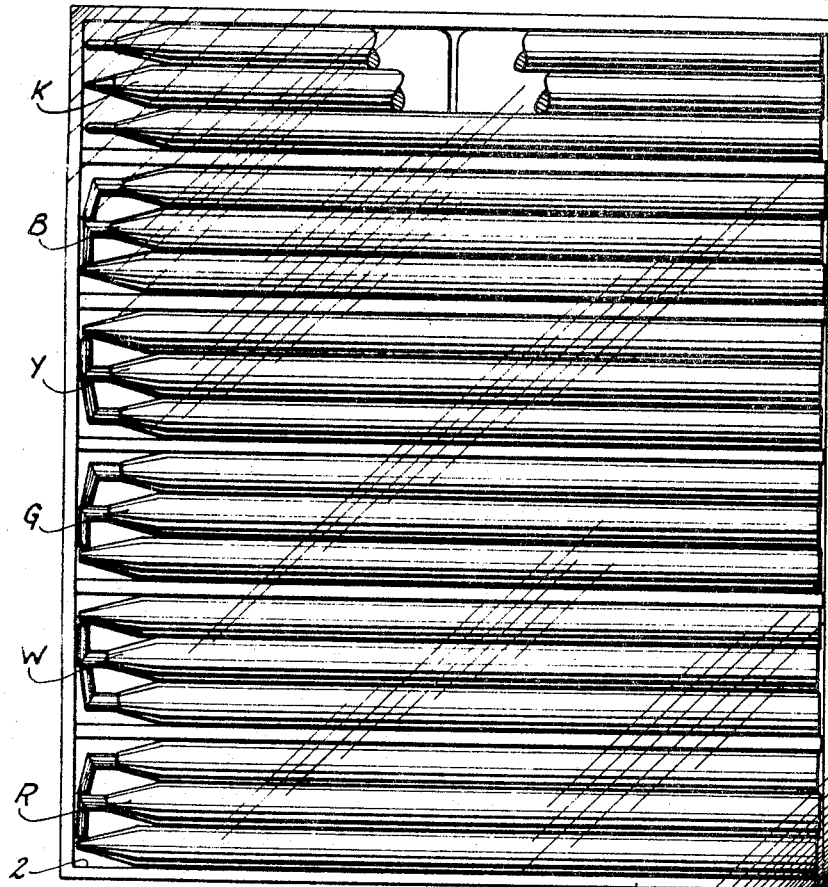

The present invention relates to a device for teaching handwriting, for the improvement of graphic style and for the rehabilitation of slightly disturbed motor activity of the upper limbs.

In psychological tests and rehabilitation, it is common practice to use a series of plates bearing the imprint of simple tracings which the subject must follow with a stylus.

In my United States Patent specification No. 2,958,956, filed Dec. 31, 1957, for "Psychological testing apparatus," I have described, in particular, an apparatus in which the contour of the tracing is electrically conductive and connected with the stylus across the respective terminals of an electric circuit, means being provided for counting the number of contacts between the stylus and the contour and for evaluating the pressure of the stylus on the tracing and the pressure of the subject's fingers on the stylus.

Such an apparatus makes it possible to measure the ability of the subject to accurately follow the tracing and to evaluate his "tactile tendencies," i.e. on the one hand, the relative importance of the various movements of the muscles of the fingers, more specifically of the thumb and the index finger in actual handwriting performance and on the other hand, the intensity of the efforts put forth by the subject on the writing instrument itself as well as on the surface on which he is writing.

Furthermore, in my French Patent No. 1,212,971, filed Oct. 21, 1958, for: "Appareil pour l'étude des tendances inverses dans l'écriture d'un individu en vue en particulier de la rééducation de celui-ci," (Apparatus for the study of the inverted motor tendencies in handwriting, particularly in view of reeducating the subject), I described a device for controlling the inclination of the stylus handled by the subject, said device being designed so that it actuates the release of a signal each time said inclination deviates from a predetermined value. In said French patent, a device is further described which actuates the release of a signal each time the subject, as a result of a loss of attention, runs through the tracing in a direction opposite to normal.

These various devices, which are not polyvalent, make it possible, when taken in combination, to obtain a rigorous diagnosis of the tactile aptitudes of the subject, and some of them may be useful in the learning of the writing movement, and in particular in the neutralization of certain inaptitudes or defective tendencies of the subject.

However, they are essentially designed for use in research or rehabilitation psycho-pedagogical laboratories or centers. Their complexity, their relatively high cost and their delicate handling make their widespread use difficult in teaching, either in the schools or by the parents.

Accordingly, it is an object of the present invention to provide a simple and polyvalent device, whose handling is accessible to unspecialized persons and which can be used comprehensively in the various functions of studying the tactile tendencies and of training the subject in the learning of graphic style and in the neutralization of his defective tendencies, the pedagogical value of these various functions, being now universally recognized.

According to an important feature of the invention, said device comprises essentially a set of plates bearing an imprint and a series of pencil-shaped non writing instruments having a body of a flexible material ending in a pointed tip, said body having a flexural rigidity graded in such a manner that the maximal pressure force which may normally be applied by the tip of the instrument to the tracing varies from one instrument to the next.

According to a preferred embodiment of the invention, there are, for each of said pressure levels, a plurality of instruments of the same color which is characteristic of said level, each one consisting of a cylindrical body made of flexible plastic material, one of the instruments of each plurality having a tapered end directed into the extension of its axis and having substantially the same flexural rigidity as the body of the instrument while the others have a tapered end which is substantially more rigid than the body of the instruments and is bent along a certain angle with respect to the axis of the instrument, this bent end consisting advantageously of a detachable tip.

According to another aspect of the invention, at least one of the plates of the series has an incised tracing and in predetermined locations of the said tracing, inclined projections which allow for easy passage of the rigid rectilinear tip of one of the instruments in the appropriate direction but which offer resistance in case of passage in the opposite direction.

According to a further aspect of the invention, there is provided further instruments with detachable felt tips, with which the subject may write in ink on paper.

These and other objects, as well as the advantages of the invention, will appear more clearly from the following detailed description of an illustrative embodiment of the device.

Figure 2:
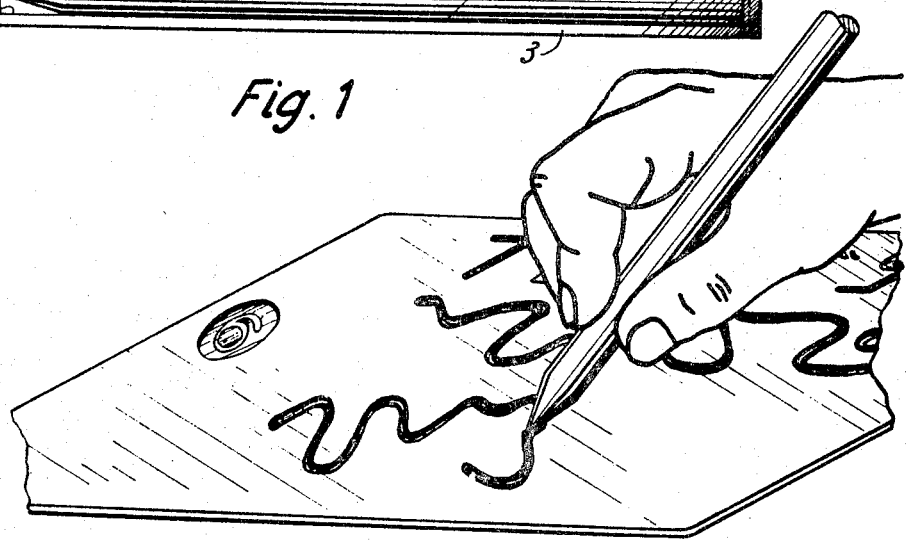
Figure 3:
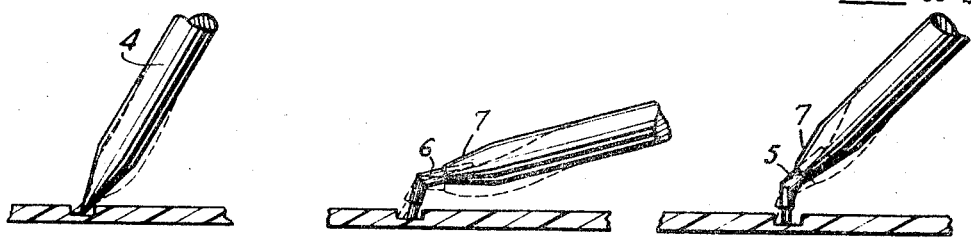
Figure 4:
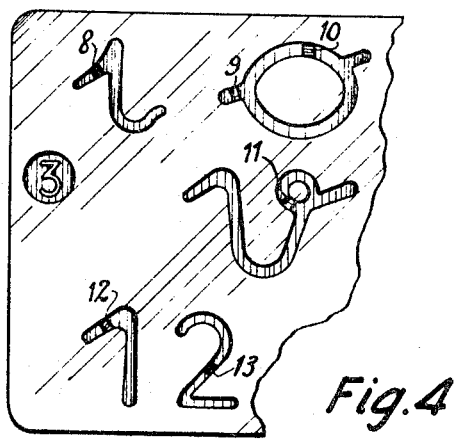
Figure 5:
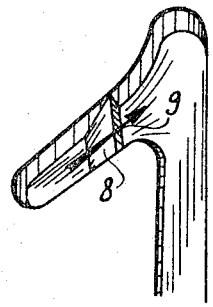

In the accompanying drawings:
FIG. 1 is a general view of a device according to the invention;
FIG. 2 shows the hand of the subject during a test carried out on one of the plates;
FIG. 3 represents different inclinations of the instrument during the execution of tests which are respectively carried out with a rigid rectilinear tip and with tips bent along different angles;
FIG. 4 is a partial plan view of a plate adapted for neutralizing the inverted motor tendencies;
FIG. 5 is a magnified perspective view, of part of a character engraved on the plate of FIGURE 4; and
FIG. 6 is a partial plan view of two other types of plates which are included in the device according to the invention.

The device shown in FIGURE 1 comprises a set of plates, such as 2–3, housed in a transparent box 1 and arranged in superimposed layers and a set of pencils placed above the plates.

In the preferred embodiment of the invention presently described, there are six plates on which are engraved numbers from 1 to 6, which make it possible to identify them immediately, and 6 groups, each consisting of three instruments.

Figure 6:
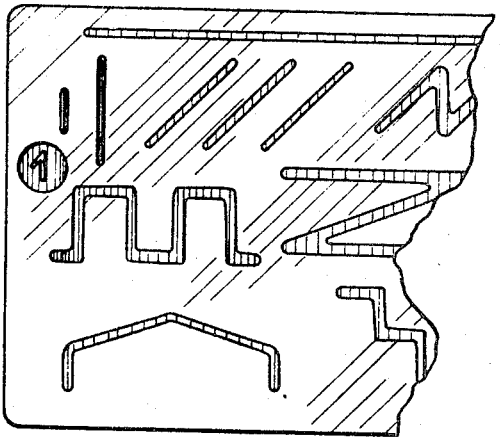

The plate numbers appear, surrounded by a circle, in FIGURES 2, 4 and 6. The bodies of the instruments in each of the first five groups are preferably of a distinct color, symbolized by a letter in FIGURE 1, and their flexural rigidities are as follows:

|  |  |  | Grams |
|---|---|---|---|
| Red instruments | (R) | | 150 |
| White do | (W) | | 125 |
| Green do | (G) | | 100 |
| Yellow do | (Y) | | 75 |
| Black do | (B) | | 50 |

These values, which are by no means limiting, are the maximal pressure forces which may be exerted by the tip of the instrument on the tracing without causing excessive distortion of the instrument. Shall such an excessive disortion occur, due to an exaggerated prehension from the subject's hand, the latter will not be able correctly and accurately to followed the engraved contour on the plate.

A first instrument in each group has an integral rectilinear tip of substantially the same rigidity as the body of the instrument (such as that shown at 4 in FIGURE 3), the second one is normally fitted with a rigid detachable tip which is bent according to a first angle (such as that shown at 5 in FIGURE 3) while the third one is fitted with a rigid detachable tip which is bent according to a second angle (such as that shown at 6 in FIGURE 3). The sixth group (K, FIGURE 1) includes for instance a white instrument having a rectilinear detachable tip substantially more rigid than its body, and black and red instruments provided with a detachable rectilinear felt tip. The bodies of the instruments of the sixth group preferably have the same flexural rigidities as the instruments of the same colour in the other groups.

It is to be understood that the instrument bodies are made of flexible material, advantageously of plastic material and that no writing material is contained in the said bodies. The normal function of the instruments is to follow the tracing on the plates, as shown in FIGURE 2, and not to effect an inscription (except for the instruments with felt tips). Such instruments will be referred to hereinafter as "styles".

The detachable tips may be fitted into the cavities (such as 7, FIGURE 3) comprising the tapered end of the second and third styles in each group. It is thus possible to substitute the tips with which these styles are normally fitted, with tips bent along different angles or with felt tips or any other types of tips which may be useful in certain exercises..

The set of plates was designed so as to allow the study of the tactile tendencies, the learning of graphic styles, and the neutralization of defective tendencies, according to a method which I, as a result of considerable experimentation, have judged the most efficient one within the framework of school requirements.

Although it is possible to imagine the use of a set of plates conceived along different lines, the one described in the present specification is considered to be the preferred mode of realization of the invention.

A first series of plates (advantageously plates No. 1 and No. 2) comprises engraved characters some of which are visible at the left hand section of FIGURE 6 and which will be referred to by the name "kinetic profiles". These characters are printed by incision into the body of the plate without completely going through it. The "kinetic profiles" were designed in order to make it possible to progressively reach a complete relaxation on the muscle groups of the forearm and of the arm during the subject's tracing performance.

The third plate (No. 3, FIGURE 4) comprises a track, also engraved along a part only of the thickness of the body of the plate, which consists of selected letters of the alphabet and of selected numbers and is particularly characterized by the presence of inclined sloping projections such as 8 to 13, in FIGURE 4. Projection 8, in FIGURE 5, is shown magnified. It is evident that it allows for easy passage of the tip of the style in the direction of the arrow, (FIGURE 5), along its inclined face, but that passage in the opposite direction is rendered difficult due to the presence of the projection's vertical face 9 which offers resistance. The net result is that the pupil will have to get used to running through the tracing in the normal direction.

Another series of plates (advantageously plates No. 4 and No. 5) comprises the letters of the alphabet engraved according to different types of graphic styles: script, cursive, Hebrew, Arabic or other chracters. These letters also are engraved along a part only of the plate and make it possible to learn the different corresponding graphic styles, as will be explained hereinafter.

Plate No. 6 (FIGURE 2) comprises a tracing, cut along the entirety of the thickness of the plate, which constitutes what is known as the "dynamic synthesis" of the Latin alphabet. In the design of this tracing, the ratios of utilization, indices of the different muscles or muscle groups of the hand and of the forearm, as determined by filming of the movements of a "live hand" through a transparent glass panel, were taken into account.

The device which has just been described is preferably used in the following manner:

The subject makes a first series of trials on plate No. 1, with a red style, then with a white style and so on up to the black style, each of the said styles being the first style of the group (which is provided with a flexible rectilinear tip).

Each trial is carried out through following the contour of the track in the manner which is illustrated in FIGURE 2. When the pressure exerted by the subject is correct, the tip is subjected but to a slight deformation on the plate (as illustrated in solid line, in 4, FIGURE 3). Shall, however, the pressure become excessive, the style is heavily deformed, as illustrated in dotted line, in 4, FIGURE 3 and the teacher, as well as the pupil, are aware of that fact. Each trial is carried out until the subject is capable of following the track with a correct pressure and with sufficient velocity. Then, the following trial of the series will be performed, with the next pencil of the graded set, which is less rigid and, therefore, more difficult to handle.

In the course of the first series of tests, the short flexors then the long flexors and the long extensors mainly are induced into action.

A second series of tests is then performed in the same manner as for the first series, but, however with plate No. 2 which mainly induces into action the abductors and also causes a synchronization of all the muscular motions of the fingers, of the hand and of the forearm to be obtained.

When the first and second series of tests have been performed, most of the parasitic muscular clenching and contracture which correspond to an overprehension of the style will have been cured.

A third series of tests is then performed with the black style of group K having a felt tip. The felt tip is dipped into ink and the subject trains himself in reproducing, on a sheet of paper, the successive lines of the tracings engraved on the plates No. 1 and No. 2. This provides a control of the automatisms which have been acquired in the course of the first and second series of tests.

A fourth series of tests will be performed with for instance the black style of group K having a rigid rectilinear tip, on the successive characters of plate No. 3. These characters have been selected after an extensive study of the frequency with which inverted tracings are effected by most of the subjects under test. The following order of the characters corresponds to an increasing difficulty encountered in the performing of a normal tracing:

Letters: *i–o–n–v–t–l*.

Numerals: 1–2–4–5–8.

The subject will try to follow the tracing of one character in the normal direction until he easily succeeds, and will then try the next character.

A fifth series of tests will be performed with plate No. 4 or 5, according to the type of graphic style which has been selected by the teacher, and with that style of each of the successive groups from red to black—which is provided with a rigid tip bent according to the first angle which has been mentioned hereinabove.

The said angle, which is illustrated at 5, FIG. 3, will advantageously be 45°.

In practice, with a style provided with a bent tip, the subject will incline the body of the style, with respect to the plane of the plate, substantially more than with a normal style. This has the effect of curing a defective tendency which is quite frequently encountered and which consists in that the pupil does not sufficiently incline its style when writing.

In a sixth series of tests, there is used, still with plates No. 4 or No. 5, that style of each of the successive groups which is provided with a rigid tip bent according to the second angle—which has advantageously 60°—the pupil will be compelled to incline yet some more the style for following the tracings on the plate, and this will complete the curing of the defective tendency.

A seventh series of trials will consist in reproducing on a sheet of paper, for instance with the red style with felt tip dipped into ink, the tracks on plate No. 4 or No. 5.

This enables one to control whether the pupil has acquired a correct inclination of the style in writing.

Plate No. 6 (FIG. 2) will be mainly used for re-education purposes. Preferably, it will be used as a stencil-plate for tracing in pencil, on a sheet of paper, the S-shaped track which is cut out in the plate. The pupil will have to lay colour within the limits of the pencil track on the sheet of paper, for instance in ink, with one of the styles provided with a felt tip.

Observation of the time which is needed for the pupil to colour the complete track and of the places along the curves which comprise the track, where the colour will overlap the limits of the track, will provide indications as to the tactile aptitudes of the pupil. This test will also advantageously be performed during the learning of handwriting by normal subjects in accordance with the method above disclosed. It will then enable the teacher to control the progress made by the pupil at various stages of the successive series of trials.

It is to be understood that various modifications may be made by the skilled man without departing from the spirit and scope of the invention.

What is claimed is:

1. A polyvalent handwriting training and psychological testing device, said device including: at least one rigid plate, a plurality of tracks imprinted on said plate, the contours of said tracks corresponding to graphic signs; a plurality of pencil-shaped non writing styles having a cylindrical elongated body made of a flexible material ending in a tapered end and adapted to be grasped by a test subject for tracing said tracks, the bodies of the respective styles of said plurality having different flexural rigidities which are graded according to a predetermined progression, said plurality of styles including styles having their tapered end directed into the extension of the axis of said cylindrical body, said end having substantially the same flexural rigidity as the said body.

2. A device as claimed in claim 1, wherein said plurality of styles includes styles having a tapered end provided with an axial cavity, said device further comprising at least one plurality of rigid non writing tips adapted for being fitted into said cavities and each including first and second portions bent along a predetermined angle with respect to each other.

3. A device as claimed in claim 1, including at least one plate provided with a track which has, in predetermined non adjacent locations of the characters thereon, inclined projecting portions adapted for allowing an easy passage of the said tapered end in a predetermined direction along the track, while substantially preventing the passage in the opposite direction.

References Cited

UNITED STATES PATENTS

| | | | |
|---|---|---|---|
| 2,911,950 | 11/1959 | Freeman | 401—209 |
| 3,197,892 | 8/1965 | Hancy | 35—37 |
| 3,352,621 | 11/1967 | Fehling et al. | 401—209 X |

EUGENE R. CAPOZIO, *Primary Examiner.*

W. H. GRIEB, *Assistant Examiner.*